United States Patent [19]

Kovács et al.

[11] Patent Number: 5,176,929
[45] Date of Patent: Jan. 5, 1993

[54] PROCESS FOR THE COMPLEX PROCESSING AND PRESERVATION OF ALIMENTARY PLANTS, PARTICULARLY SEASONAL ALIMENTARY PLANTS

[75] Inventors: Sándor Kovács; Czifrik, Gizella; Sándor Fülöp, all of Kiskunmajsa; László Német. Budapest; Béla Jóvór, Budapest; Sándor Doleschall, Budapest; Géza Pap, Budapest; Guyla Gáti, Budapest; Rozália Ádám, Budapest, all of Hungary

[73] Assignees: Magyar Szenhidrogenipari Kutatofejleszto Intezet; Jonathan Mgtsz, both of Kiskunmajsa, Hungary

[21] Appl. No.: 656,076

[22] PCT Filed: Jun. 29, 1990

[86] PCT No.: PCT/HU90/00044
§ 371 Date: Feb. 25, 1991
§ 102(e) Date: Feb. 25, 1991

[87] PCT Pub. No.: WO91/00026
PCT Pub. Date: Jan. 10, 1991

[30] Foreign Application Priority Data

Jun. 29, 1989 [HU] Hungary ............... 3312/89
Aug. 7, 1989 [HU] Hungary ............... 3312/89

[51] Int. Cl.⁵ ............................................. A23L 2/18
[52] U.S. Cl. ............................ 426/50; 426/330.4; 426/330.5; 426/321
[58] Field of Search ............ 426/330.4, 330.5, 321, 426/50

[56] References Cited

U.S. PATENT DOCUMENTS

| | | | |
|---|---|---|---|
| 770,658 | 9/1904 | Sandmann | 426/330.5 |
| 4,327,184 | 4/1982 | Johnson | 426/494 X |
| 4,405,652 | 9/1983 | Boucher | 426/493 X |
| 4,626,437 | 12/1986 | Schobinger et al. | 426/493 X |

FOREIGN PATENT DOCUMENTS

| | | |
|---|---|---|
| 0014340 | 8/1980 | European Pat. Off. |
| 0077745 | 4/1983 | European Pat. Off. |
| 2541866 | 9/1984 | France ............... 426/321 |
| 2609238 | 7/1988 | France |

OTHER PUBLICATIONS

Enzymes Topics. Pectinol Enzymes in Processing Fruit Juice. No. 3, May 1964. Published by Rohm & Haas, Philadephia, Pa., 4 pages.
P. H. List et al. Rogers Handbuch der Pharmazeutischen Praxis, vol. (1971), pp. 25-27, 65-72.

Primary Examiner—Joseph Golian
Attorney, Agent, or Firm—Herbert Dubno

[57] ABSTRACT

The invention relates to a process for the complex processing and preservation of alimentary plants, mainly seasonal alimentary plants. The process according to the invention comprises—depending on the type of the plant—purifying and, if desired, crushing the plant, digesting it, adjusting it to other alcohol content of 15 to 45% by volume by adding ethanol before or after separation of the solid part, letting it stand for at least 3 weeks, then separating the solid and liquid phases, storing the liquid phase for an optional time, if desired absorbing carbon dioxide or in inert gas in the material to be fed in, then after pre-heating the liquid to a temperature between 50° and 100° C., distilling the alcohol from it by flash distillation under a pressure of 6.4-26.6 kPa, at a temperature of 40° to 80° C. by using both during the pre-heatment and distillation a dynamical carbon dioxide or other inert gas atmosphere and preparing a drinking juice under sterile conditions from the product of low alcohol content obtained as bottom product or subjecting it to an other processing method commonly used in the food industry known per se; and processing the alcoholic fraction obtained as head product to a liquor in a known way, or utilizing it for flavoring food products, or recyclizing it to the process, and, if desired, utilizing the solid material obtained in the separation before storage for a food industrial purpose after drying it in a known manner.

11 Claims, 1 Drawing Sheet

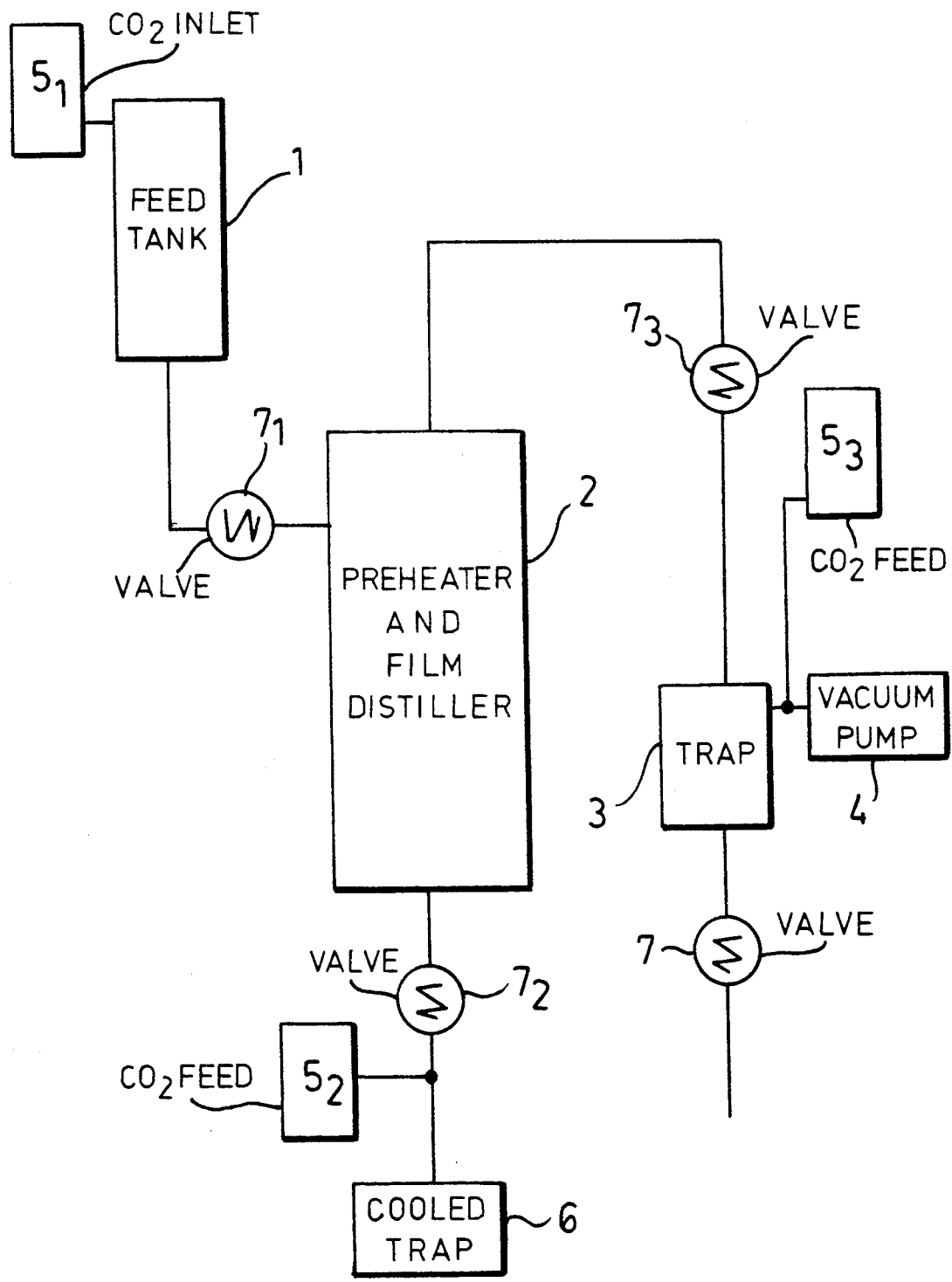

PROCESS FOR THE COMPLEX PROCESSING AND PRESERVATION OF ALIMENTARY PLANTS, PARTICULARLY SEASONAL ALIMENTARY PLANTS

FIELD OF THE INVENTION

This invention relates to a complex process for the processing and preservation of alimentary plants, particularly seasonal alimentary plants, e.g. fruits and vegetables, which provides products free from preservatives, which are delicious, and which possess a high biological value as well as similar organoleptic properties as that of the original fresh, raw plant material. The plants and plant parts processed by using the process according to the invention can completely be utilized while the alcohol used as an auxiliary substance for preservation can be employed several times. The products obtained such as drink-concentrates, coloring concentrates and the like maintaining the original color and flavor of the plant may be used as soft drinks or for the preparation thereof, and as flavors for milk products, preferably whipped milk products, cheeses or flavored yogurts. The fibrous residue obtained in the processing may also be utilized for food-industrial purposes.

BACKGROUND OF THE INVENTION

It is known that most of the alimentary plants are of seasonal character and the ripening period of some fruits and vegetables is relatively short.

This results in the following drawbacks:

original, fresh fruits or vegetables are available only during a relatively short period of the year.

the available processing capacity may not allow the complete utilization of the crop whereby a significant proportion is lost or is utilized in a less valuable manner (e.g. for distilling or for the preparation of fodders from fruits or vegetables), and the transfer of large amounts of biologically ripe fruits over long distances can be achieved only with high costs, if at all, and frequently with deterioration of the quality.

The recently available processing methods offer to the researchers several tasks to be solved, e.g. one of the highest difficulties of preparing juices of natural raw material and other food compositions obtained from various fruits is that, in most cases, a long interval elapses up to the processing of the harvested fruits and bottling of the juice. During this period the protection of the fruit against microorganisms and inhibition of its native enzyme system should be ensured in a manner providing the most complete maintenance of nutritive ingredients and flavor substances of the freshly harvested fruits. According to the present practice, two methods are used, for accomplishing this task, however, these methods are expensive and are not fully satisfactory.

1) chemical preservation of the must is typically achieved by adding to the product 1000 to 1200 mg/liter of free sulfurous acid and storing product until the further processing.

The sulfurous acid provides a real protection against microorganisms which, however, does not last for a long time since the acid becomes bound and has to be supplemented for maintaining its effect from time to time. According to the observations, the flavoring (aromatizing) materials are also damaged by sulfurous acid, particularly when the must stored is concentrated for the further processing. Due to the required long-lasting heat effect, in addition to the heat-decomposition of a part of the natural flavor substances, sulfur-containing flavor substances with an unpleasant taste may be formed. The health-damaging effect of sulfurous acid is also well-known.

2) Pasteurizing, another widely used method of preservation, does not fulfill all requirements either: The costs and the power demand of the equipment are high; the heat-effect used causes the loss of a part of flavor substances and eventually the occurrence of unpleasant flavor substances. It is particularly to be emphasized that heat-sensitive vitamins are decomposed during pasteurizing and thus, in addition, the biological value of the composition is also deteriorated together with the organoleptic value.

The problem discussed above is valid to a greater or lesser degree also in the processing of vegetables. The preservation of tomato can be mentioned as an example.

Ethanol has been used as an ideal preserving agent e.g. in the liquor industry since ancient times. The fruit compositions thus preserved are incorporated in alcoholic drinks. Ethanol is an optimal preserving agent due not only to its persistent action but also to the formation of various fruit esters enriching the original flavors of the fruits.

This method of preservation, however, cannot be used widely because, due to its alcohol content, the utilization of the preserved plant material stabilized by ethanol is possible only in a limited range of food materials.

OBJECT OF THE INVENTION

Considering that the preservation by alcohol is more preferred than the other methods on the basis of a number of reasons to be discussed hereinafter, the object was set to develop a process which provides preservation by alcohol and removes the alcohol before the desired use of the product under mild conditions together with the optimal maintenance of the nutritive ingredients and flavor content of the plant and without using any preserving agent.

SUMMARY OF THE INVENTION

There are several known methods for the complete or nearly complete removal of alcohol. These are used mainly for diminishing the alcohol content of wines, but, of course, similarly can be used for lowering the alcohol content of other alcoholic food products in the form of filtered solutions.

There are known processes for the preparation of wines with such low alcohol content using e.g. distillation (e.g. Belgian patent specification No. 900,359) or using an osmotic method (e.g. European patent specification No. 162,240). However, by these methods the character, taste, flavor and bouquet of the original wine could not be successfully preserved. The alcohol-free product obtained by using the above methods is subsequently mixed with must or grape juice; thus, it is not the original wine, which is reconstituted in an alcohol-free modification but, rather a new soft drink is prepared by using it.

The alcohol content of wine may also be diminished by extraction with high-pressure liquid $CO_2$ (see e.g. the German patent specifications Nos. 2,902,007 and 3,024,005). A serious drawback of this process is that the alcohol content of the wine can be decreased only to a limited extent.

On the basis of simultaneous consideration of productivity, investment cost and economical operation, the distillation method seems to be useful for industrial realization. Thus we investigated the distillation processes. However, the alcohol-free product or product of reduced alcohol content obtained by distillation under atmospheric conditions had an unpleasant (sour) after taste and this drawback could not be avoided either by carrying out the distillation under reduced pressure.

Unexpectedly, it has been recognized that the disadvantages occurring in other distillation processes discussed above do not appear when ethanol is removed under a dynamical inert gas atmosphere, i.e. by distillation under reduced pressure while continuously introducing an inert gas. It is supposed that this might be attributed to the effect of the protective atmosphere, i.e. to the effect of $CO_2$ or other inert gas environment advantageously influencing the relative volatility ratios in the ethanol/water system, exerting a salutary effect in respect of heat-decomposition and oxidative decomposition of the flavor and color substances.

Another unexpected effect was observed when the dynamical inert gas atmosphere was ensured not only in the distilling equipment but also in the storage vessel of the alcohol-containing material to be distilled.

By combining the preservation by ethanol known per se with the removal of alcohol according to the invention, an unexpectedly simple preservation process has been developed by which the quality of the stored product can be effectively preserved for a practically unlimited time. Disadvantages characterizing the known processes do not occur in the course of either the storage or the subsequent processing.

During the mild removal of alcohol described above, the flavor substances of the material preserved are not damaged and the product retains its original taste, color and bouquet. The complex technological system according to the invention is useful to obtain the juice of fruits, vegetables and other plants and all other utilizable materials thereof, respectively, except the fibrous materials, in an economical manner, without using any preservative or pasteurizing, on the basis of physical, chemical properties and biological action mechanism of ethanol.

The fibrous material is separated, treated depending on the intended utilization (drying, pelletizing and the like) and used e.g. as a basic material of muesli.

A particular advantage of the present invention consists therein that its investment costs are very low and the equipment can be developed from the elements of the technological procedures of enology, the distilling industry and the canning industry.

In the course of the process according to the invention
1) the fruits or vegetables, respectively are purified, digested and preserved by alcohol,
2) the preserved material is stored for the time desired,
3) alcohol is removed from the stored alcoholic fruits and/or vegetables by flash distillation under reduced pressure in a dynamical $CO_2$ and/or inert gas atmosphere,
4) and optionally, the product is processed to the desired product by using a known technological procedure of the food industry or is incorporated into the desired product.

The process according to the invention is hereinafter discussed in detail.

1) Purification, digestion and preservation

In the first step of the technological procedure, purification and digestion depending on the type of the raw material used are carried out. Under "digestion" a mechanical and eventually supplementing enzymatic digestion, are meant in this description.

Various kinds of vegetables and fruits, mainly seasonal vegetables and fruits are used.

From the aspect of the process according to the invention, the most important fruits are e.g.: apple, plum, grape, cherry, morello, apricot, peach, orange, lemon, tangerine, grape fruit, field strawberry, raspberry, blackberry, red currant, pear, quince, avocado, pineapple, banana, gooseberry, cornel, bilberry, blackthorn, medlar, muscatmelon, watermelon, kiwi, mango, maracuja, date, fig, elderberry, rhubarb, coffee, nut and coconut.

The most significant vegetables include e.g.: carrot, parsley, parsnip, celery, onion, leek, chives, garlic, paprika, tomato, cabbage, savoy, Brussels sprouts, kohlrabi, cucumber, zucchini, pumpkin, patisian, aubergine, cauliflower, broccoli, sorrel, spinach, mangold, french beans, sugar peas, soy, lettuce, mushroom, asparagus, radish, beetroot and horseradish.

After a suitable purification the raw material used is subjected to digestion. From the view-point of digestion the raw materials used are divided to two main types.

Type I: Fruits and vegetables rich in juice, such as morello, cherry, raspberry, red currant, gooseberry, grape, apricot, peach and the like as well as e.g. tomato. From these fruits and vegetables a fibrous juice is obtained after crushing by pressing. The juice obtained is directly introduced into the storage vessel where it is mixed with alcohol to adjust the alcohol content of the mixture to a value between 15 and 45% by volume. Under the effect of alcohol the digestion completely proceeds by diffusion within a few weeks; heating or cooling is unneccessary. The solid and liquid phases of the alcoholic mixture are well separated; they are easy to separate by a simple racking.

Type II: Apple, pear and other fruits containing less juice, and vegetables such as carrot, beetroot, celery, squash, cucumber, garlic, onion, paprika and the like. Here, the digestion is preceded by a physical grinding. The ground and crushed material is soaked in alcohol and macerated to promote the digestion; if desired, a digestion-promoting, e.g. pectin-decomposing enzyme is used before adding alcohol. During the above operation, the soluble components of the fruits or vegetable are dissolved within a short period whereas a high percentage of the solid parts is broken down. In this case the separation of the macerate has to be accelerated by using e.g. a suitable press.

2) Storage

The storage and the subsequent technological procedure are uniform and independent of the type of the starting material.

After the following separation a fiber free, alcoholic juice of fruit or vegetables, respectively with a complete value is obtained. The alcohol content is suitably adjusted between 15 to 30% by volume.

The biological stability is completely ensured by such an alcohol content. It is a proved fact that neither fungi nor bacteria can exert their biological effects in the presence of such an alcohol amount. Any storage vessel used in the food industry is suitable for the storage.

In the case of a long period storage suitably closed, light-protective vessels insulated from heat are used, however, the ascertainment of sterility is not an essential viewpoint in this stage either. Under these conditions each of the original preferable properties, i.e. color, flavor, sugar and vitamin content and the like of the semi-finished product can be maintained under the natural conditions even for 3-6 years according to our investigations.

3) The removal of alcohol

The rough scheme of the equipment used for removing the alcohol is illustrated in the figure. The main elements of this equipment are:
1. Feed tank with introduction of $CO_2$ and/or inert gas
2. Pre-heating and film-distilling equipment
3. Head product receiving trap
4. Vacuum pump
5. Inlets for $CO_2$ and/or inert gas
6. Cooled trap for receiving the product
7. Valves The operation of the above equipment is summarized hereinafter.

The alcoholic extract of the fruit or vegetables used as starting raw material is filled into the feed tank 1. Optionally, $CO_2$ or an inert gas is absorbed in the extract before beginning the operation. While keeping the inlet valve $5_1$ for $CO_2$ and/or inert gas in an open state, the vacuum pump 4 is switched on. The operation of cooling and heating cycles of the film-evaporator 2 is controlled. After achieving the desired temperature and reduced pressure, the feeding of the material is started through the pre-heater into the film-evaporator by opening the feed-regulating valve $7_1$. After termination of the operation, the alcohol-free product and ethanol, obtained are emptied respectively by opening the bottom product-emptying valve $7_2$ and head product-emptying valve $7_3$.

During the above operation preferably helium or nitrogen, more preferably $CO_2$ are used as inert gases. The pre-heating is performed up to a temperature of 50° to 100° C. By using the above equipment, the reaction conditions of the flash distillation are as follows: pressure: 6.4–26.6 kPa, preferably 6.4–23.9 kPa; temperature 40° to 80° C., preferably 60° to 80° C., more preferably 65° to 80° C.; $CO_2$ and/or inert gas are introduced in an 5 to 10-fold amount calculated on the volume of the alcoholic extract of fruit or vegetables fed in.

After the desired storage period for the preparation of the finished product the main task is to separate the alcohol used for preservation from the juice of fruit or vegetables.

This operation can rapidly be carried out at a relatively low temperature by using the alcohol-removing equipment described above while the product completely retains its flavor and color substances.

By the separation two products are obtained:

The bottom product, i.e. a juice of vegetables or fruit with an alcohol content of 0.3 to 1% by volume, which requires sterile conditions (during both the further storage and formulation). This product can also directly be consumed, is delicious and possesses a high biological value.

The other, similarly important product obtained in course of the separation carried out by distillation is a fruit or vegetable fraction of about 30 to 51% by volume of alcohol which product can be directly consumed and it is a fine, peculiar alcoholic drink with a pleasant bouquet.

4) Further processing of the products obtained a) If desired, the juice of vegetables or fruit obtained as bottom product may be processed to jelly, drinking juice or natural flavoring in a known manner. In the preparation of the drinking juice a 0 to 10-fold dilution is used.

b) If desired, the juice of fruit or vegetables containing 30 to 51% by volume of alcohol obtained as head product may further be refined up to an alcohol concentration of 60 to 80% by volume in the distilling equipment according to the demands. This fraction with a high alcohol content may be recycled into the preservation procedure and again utilized for the preservation of fresh plant material. (It should be noted that the recycled alcohol can be used for preserving only the same fruit from which it has been separated since a small part of the flavor components is present in this fraction.)

After several uses the amount of flavor substances is increased; their accumulation has an advantageous effect on the juices preserved.

The concentrates and coloring concentrates prepared from the juices of vegetables and fruits can be utilized as flavoring and coloring substances, e.g. for flavouring and/or coloring of milk products, mainly of whipped milk products, cheeses or yogurts.

The process discussed above possesses several advantages in comparison to the known processes. The most important advantages are the followings:

it can be used within a practically unlimited scope of fruits and vegetables.

the plant material can be stored for a practically unlimited period.

the alcohol can be removed from the material stored simultaneously with the complete retention of the flavors, colors and other valuable ingredients.

the obtained product ready for consumption does not contain any preserving agent, due to the nearly complete removal of alcohol, the product obtained can widely be utilized, and the alcohol distilled out from the stored product may be used as alimentary substance or recycled in the process whereby the economy of the process can be improved.

SPECIFIC EXAMPLE

The process according to the invention is illustrated in detail by the following non-limiting Examples.

EXAMPLE 1

Preservation of morello fruit

The fruit was processed by using the process according to the invention. After crushing and pressing 80% by weight (80 kg) of fibrous juice were obtained from 100 kg of fresh fruit.

The alcohol content of the fibrous juice was adjusted to 25% by volume by adding pure ethanol of 96% by volume. The alcoholic fibrous fruit juice was left to stand for 3 weeks while promoting the complete dissolution by stirring daily for a short time.

After stopping the stirring, the solid and liquid phase showed a pronounced separation and were easy to separate by physical method.

Thereafter, the pure fruit juice (containing 22% by volume of alcohol after the losses) was stored under the conditions described above for 3 years. After the storage of 3 years the main characteristics of the semi-finished product were as follows:

| | |
|---|---|
| Alcohol content | 21.3% by volume |
| Sugar content | 72 g/liter |
| total acid content | 10 g/liter |
| Total extract | 91 g/liter |

The product became more delicious, the tastes became more equilibrated, the acid sensation more blunt and the drink became more round and uniform.

Subsequently, the removal of alcohol was carried out, by feeding in the material to be made free from alcohol at a rate of 10 liter/hour, pre-heating it to 75° C., introducing $CO_2$ at a rate of 50 liter/hour and carrying out the distillation under a pressure of 13.3 kPa at 65° C.

The separation resulted in the following products:

| I. Fruit juice: 67% by volume | |
|---|---|
| Alcohol content: | 0.9% by volume |
| Titratable acid: | 14 g/liter |
| Total extract | 135 g/liter |
| Sugar content: | 107 g/liter |
| II. Fruit fraction 27% by volume | |
| Alcohol content: | 56% by volume |
| Volume loss | 6% |
| (this could nearly completely be attributed to the alcohol taken away by the vacuum; this loss could be decreased by using a suitable trap) | |

The organoleptic examination afforded the expected results in the cases of both products. In addition to the primary flavors and bouquet substances of the fruit, fine secondary flavor substances were also developed.

The fruit juice-semi-concentrate-could be consumed as a drinking juice in a dilution of 50 to 70% by volume.

After supplementing its sugar content to 300 g/liter, a natural fruit juice was obtained.

By using the above additional operations the alcohol content decreased below 0.5%. After carrying out the experiment with a cored fruit, the characteristic morello taste of the fruit juice became slightly weaker but it remained pleasant.

The above experiments were carried out by using also other fruits such as apple or apricot and similar results were obtained.

When necessary, e.g. in the case of apple and pear, a pectin-decomposing enzyme was added to the fibrous juice before admixing it with alcohol.

EXAMPLE 2

PROCESSING OF GRAPE

These experiments gave other, different results mainly in the relation of their utility.

A special care was taken of the fast processing.

After harvesting the grape was immediately pressed and preserved by using alcohol of 96% by volume in the previous manner.

Due to the rapid preservation, the native reductones were less damaged and the color of the must did not become deeper.

During the processing, contrary to the earlier practice, no sulfuring was used, which sulfuring has been destined to promote the digestion and, on the other hand, to ensure the microbiologic protection according to the usual practice.

These tasks were solved by using alcohol. (The digestion related here to the residual fiber content of the must.)

Further on, the process described in the preceding Example was followed. The more important analytical results of the mistelle were as follows:

| | |
|---|---|
| Alcohol content | 18% by volume |
| Sugar content | 140 g/liter |
| Acid content | 5 g/liter |
| Total extract: | 159 g/liter |

The alcohol was removed under the following circumstances: the material to be made free from alcohol was introduced at a rate of 10 liter/hour, by introducing 80 liter/hour of $CO_2$, pre-heating to 60° C. and distilling under a pressure of 20.0 kPa at 45° C.

The semi-concentrate obtained by removing the alcohol possessed several advantageous features compared with the semi-concentrates prepared according to known processes and used till now. It had a light color, had a reductive character, pleasent flavor and odor, optimal acid content and contained no sulfur or oxymethylfurfural.

The possibility of utilization of the sweet reserve thus prepared bears a great importance in the enology since it is of natural character and free from any preservatives. (While adjusting the sugar content of "Spatlase", "Auslese" and "Ausbruch" wines it is extraordinarily important that the sugar-free extract be not decreased and the maximum total alcohol content be not increased by adding the mistelle.)

EXAMPLE 3

Processing of tomato

The technologic procedure of preservation of the tomato was developed on the basis of observations previously made on fruits.

Processing:

the tomato was crushed and the raw pulp obtained was mixed with alcohol of 96% by volume in a ratio resulting in an alcohol content between 20 and 22% by volume. After stirring for 24 hours the material became uniform. No change indicating oxidation was observed in the course of the digestion or stirring. The bouquet and taste of the pulp proved to be identical with those of the starting material.

The liquid and solid phases were separated.

Liquid phase (⅓ or ¼ part by weight depending on the sort of tomato)

A transparent drink with a pale reddish-yellow color, tomato bouquet and taste showing the following characteristics was obtained.

| | |
|---|---|
| Alcohol content: | 21.2% by volume |
| Sugar content: | 23.8 g/liter |
| Acid content: | 4.6 g/liter |
| Brix-grade: | 10.75 |

(The concentration of the tomato juice was 11.0 Brix-grade before the separation.)

This juice was unsuitable for the direct consumption since it was organoleptically very different from the taste accepted by the consumers.

Solid phase (⅔ or ¾ part by weight)

It was a bright red material with the bouquet and taste of fresh tomato which was unsuitable for the direct consumption due to its residual alcohol content.

Preparation of the finished product

The liquid phase was made free from alcohol after 4 months as described above for the fruits.

The material to be made free from alcohol was introduced at a rate of 15 liter/hour, by introducing 50 liter/hour of $CO_2$, pre-heating to 80° C., and distilling under a pressure of 13.3 kPa at a temperature of 45° C.

The alcohol recovered was a pale yellow fraction with a taste slightly reminiscent of tomato, with an alcohol content of 42.3% by volume.

This alcohol fraction seemed to be suitable only for repeated use for preservation. Tomato juice made free from alcohol A drinking juice possessing the taste, bouquet and ingredient content of the fresh tomato was obtained which showed the following characteristics:

| Alcohol content | 1.43% by volume |
|---|---|
| Sugar content | 38.5 g/liter |
| Acid content | 6.9 g/liter |

In the preparation of the drinking juice as finished product the alcohol content was diminished suitably below 0.5% by dilution with water and the sugar content was adjusted between 40 and 60 g/liter. Processing of the solid phase to a finished product The remaining solid phase weighing about ¼ part by weight was dried under suitable conditions under $CO_2$ as protective gas under reduced pressure at 40° C. until it became air-dry.

In this way a brick-red tomato powder was obtained in the form of a non-oxidized fibrous product with a pleasant bouquet and taste.

Utilization

The dry product could be used as an additive or base material for various foods (e.g. muesli, desiccated soups and the like); furthermore it could be compressed to tablets together with other desiccated vegetables being useful for supplementing the alimentation by the intake of native fibrous material.

EXAMPLE 4

Preservation of carrot 100 kg of fresh carrot was transmitted through a slicing machine, then after crushing and pressing, the alcohol content of the fibrous juice obtained was adjusted to 25% by volume by adding ethanol of 70% by volume. Soaking was continued for 4 weeks while macerating the mixture. During this period the cells of the plant were decomposed. The fibrous substance was in a nearly completely separated state; final separation was carried out by pressing.

The separation of the alcohol from the alcoholic carrot juice was carried out after one year. The material to be made free from alcohol was introduced at a rate of 15 liter/hour by introducing 60 liter/hour of $CO_2$, preheating to 60° C. and distilling under a pressure of 24.0 kPa at a temperature of 40° C.

The head product was a transparent, pale yellow product containing 45% by volume of alcohol.

The bottom product was a pleasant semi-concentrate showing the taste, color and flavor of carrot.

The dilution and preparation of juice was performed as described in Example 1.

After partly or completely drying the fibrous material remaining after pressing, as described in Example 3, a paste or tablets could be prepared, optionally with mixing the fibrous material with other vegetables.

Utilization

According to Example 3.

The above investigations were carried out also with other sorts of vegetables, e.g. with two sorts of onion, celery and beetroot. The results obtained were analogous to those described above.

When the fibrous material is kept in the alcoholic medium for a substantially longer time than 3 to 4 weeks after pressing, if necessary, it can be washed to alcohol-free with water and again pressed.

EXAMPLE 5

Preparation of a celery extract 20 kg of fresh, washed celery-greens was crushed, placed in a fine, rust-proof net and put into a closed vessel. From the closed space the air was expelled by filling the vessel with $CO_2$ up to a pressure of $1.2 \times 10^2$ kPa, then 10 liters of alcohol of 40% by volume were filled into the vessel. The alcohol was stirred by a pump operated for $2 \times 10$ minutes in every hour for 5 days. After termination of this operation, the alcoholic extract was removed, the fibrous part was pressed and the alcoholic extract pressed out was combined with the alcoholic extract previously separated.

In this way 22.6 liters of a dark-green celery extract with a characteristic celery bouquet and taste of an alcohol content of 17.6% by volume, as well as 7.3 g of fibrous residue were obtained.

The extract could be stored for an optional period; the removal of the alcohol was carried out directly before the use. The material to be made free from alcohol was introduced at a rate of 10 liter/hour, by introducing 50 liter/hour of $CO_2$, pre-heating to 75° C. and distilling under a pressure of 10.0 kPa at a temperature of 55° C.

Thus, 11.5 liters of head product containing 32.8% by volume of alcohol and 10.3 liters of bottom product containing 0.5% by volume of alcohol were obtained. After supplementation of the alcohol content to 40% by volume, the head product was repeatedly utilized for preservation of celery.

EXAMPLE 6

Use of a celery extract for the preparation of a flavored cheese

The celery extract prepared according to Example 5 could be used e.g. for the preparation of cheese by mixing it in a ratio of 2 to 5% to milk pretreated as usual for the preparation of soft cheese (heat-treated milk adjusted to a desired fat content). Further on, the technological procedure of the preparation of soft cheese was performed.

In the course of the cheese production several advantages of using the preservative-free extract of vegetables became evident. It became apparent that the microbiological-enzymatic processes playing an important role in the maturation of cheese were not inhibited by the extract. Thus, flavoured cheeses possessing a stable quality could be produced. In the finished product the flavor and bouquet of celery being in a peculiar harmony with the cheese could mildly and pleasantly be felt.

We claim:

1. A process for complex processing and preservation of a fruit or vegetable, to obtain a fruit or vegetable juice having an alcohol content of 0.3 to 1% by volume, which comprises the steps of:
    (a) purifying and digesting the fruit or vegetable;
    (b) preserving the fruit or vegetable by adding ethanol thereto so that the fruit or vegetable has an alcohol content of 15 to 45% by volume;
    (c) allowing the fruit or vegetable treated with ethanol according to step (b) to stand for a period of time sufficient to form a solid phase and a liquid phase containing the ethanol;
    (d) separating the solid phase from the liquid phase of the fruit or vegetable treated with ethanol, and storing the liquid phase for up to 6 years where biological stability of the liquid phase is ensured by the ethanol;
    (e) flash-distilling the ethanol from the liquid phase under a reduced pressure of 6.4 to 26.6 kPa, at a temperature of 40° to 80° C. by continuously employing a dynamic inert gas atmosphere to obtain as a bottom product, a fruit or vegetable juice having an alcohol content of 0.3 to 1% by volume, and as a head product, an alcoholic fraction;
    (f) preparing a juice under sterile conditions from the bottom product which can be utilized for drinking or for flavoring a food product; and
    (g) processing the head product containing the alcoholic fraction to form a liquor, utilizing said head product for flavoring food products, or recycling said head product to said preserving process according to step (b).

2. The process defined in claim 1 wherein according to step (a) the digestion is carried out mechanically.

3. The process defined in claim 1 wherein according to step (a) the digestion is carried out using a pectin-decomposing enzyme.

4. The process defined in claim 1 wherein according to step (e) the flash-distilling of the ethanol from the liquid phase is carried out under a pressure of 6.4 to 23.9 kPa.

5. The process defined in claim 1 wherein according to step (e) the flash-distilling of the ethanol from the liquid phase is carried out at a temperature between 40° and 70° C.

6. The process defined in claim 1 wherein according to step (e) the flash-distilling of the ethanol from the liquid phase is carried out using carbon dioxide as the inert gas atmosphere.

7. The process defined in claim 1 wherein according to step (f) the fruit or vegetable juice is concentrated.

8. The process defined in claim 1 wherein following step (d) the solid phase separated from the liquid phase is subjected to drying, then granulating or formulating by pressing.

9. The process defined in claim 1 wherein according to step (f), the juice from the bottom product is celery juice used to flavor soft cheese with a celery taste by mixing the celery juice in an amount of 2 to 5% with milk pretreated for preparing soft cheese.

10. The process defined in claim 1 wherein according to step (f), the juice from the bottom product is a drinking juice and is diluted with water by 0 to 10 fold.

11. The process defined in claim 1 wherein according to step (e), the liquid phase is allowed to absorb the inert gas prior to flash-distilling the liquid phase to remove the ethanol.

* * * * *